(12) United States Patent
Mao et al.

(10) Patent No.: US 9,091,849 B2
(45) Date of Patent: Jul. 28, 2015

(54) WEARABLE DISPLAY AND ADJUSTING METHOD THEREOF

(71) Applicant: INDUSTRIAL TECHNOLOGY RESEARCH INSTITUTE, Chutung, Hsinchu (TW)

(72) Inventors: Shys-Fan Yang Mao, Zhubei (TW); Ming-Hui Lin, Zhudong Township, Hsinchu County (TW); Wen-Jun Zeng, Qionglin Township, Hsinchu County (TW)

(73) Assignee: INDUSTRIAL TECHNOLOGY RESEARCH INSTITUTE, Chutung, Hsinchu (TW)

( * ) Notice: Subject to any disclaimer, the term of this patent is extended or adjusted under 35 U.S.C. 154(b) by 183 days.

(21) Appl. No.: 13/862,239

(22) Filed: Apr. 12, 2013

(65) Prior Publication Data

US 2014/0062840 A1    Mar. 6, 2014

Related U.S. Application Data

(60) Provisional application No. 61/695,390, filed on Aug. 31, 2012.

(30) Foreign Application Priority Data

Dec. 27, 2012   (TW) .............................. 101150615 A (51) Int. Cl.
*G09G 5/00* (2006.01)
*G02B 27/01* (2006.01)

(52) U.S. Cl.
CPC ...... *G02B 27/017* (2013.01); *G02B 2027/0163* (2013.01); *G02B 2027/0181* (2013.01); *G02B 2027/0198* (2013.01)

(58) Field of Classification Search
CPC .................... G02B 2027/0163; G02B 27/017; G02B 2027/0198; G02B 2027/0181
USPC ............................................................. 345/8
See application file for complete search history.

(56) References Cited

U.S. PATENT DOCUMENTS

| 3,866,907 A | 2/1975 | Goudie et al. |
| 5,737,060 A | 4/1998 | Kasha, Jr. |

(Continued)

FOREIGN PATENT DOCUMENTS

| CN | 101163236 | 4/2008 |
| TW | 508454 B | 11/2002 |

(Continued)

OTHER PUBLICATIONS

Rolland, et al., "Displays—Head-Mounted", 2005, 16 pages.

(Continued)

*Primary Examiner* — Charles V Hicks
(74) *Attorney, Agent, or Firm* — Muncy, Geissler, Olds & Lowe, P.C.

(57) ABSTRACT

A wearable display and an adjusting method thereof are provided. The adjusting method comprises the following steps. A background image is provided. A central mark is displayed and overlapped with the background image. A first sight line passes through the central mark. A blind spot mark is displayed and overlapped with the background image. A second sight line passes through the blind spot mark. An included angle between the first sight line and the second sight line is substantially 14 to 16 degrees.

24 Claims, 7 Drawing Sheets

(56) References Cited

U.S. PATENT DOCUMENTS

| | | | |
|---|---|---|---|
| 6,124,843 | A | 9/2000 | Kodama |
| 6,127,990 | A | 10/2000 | Zwern |
| 6,611,385 | B2 | 8/2003 | Song |
| 7,133,207 | B2 | 11/2006 | Travers |
| 7,145,726 | B2 * | 12/2006 | Geist .............................. 359/630 |
| 7,401,920 | B1 | 7/2008 | Kranz et al. |
| 7,542,210 | B2 | 6/2009 | Chirieleison, Sr. |
| 8,113,657 | B2 | 2/2012 | Eberl et al. |
| D659,741 | S | 5/2012 | Heinrich et al. |
| 2003/0184602 | A1 | 10/2003 | Kuroki et al. |
| 2009/0189974 | A1 | 7/2009 | Deering |
| 2011/0090135 | A1 | 4/2011 | Tricoukes et al. |

FOREIGN PATENT DOCUMENTS

| | | |
|---|---|---|
| TW | I308845 | 4/2009 |
| TW | I346795 | 8/2011 |
| TW | 201312384 | 3/2013 |
| WO | WO 03/026500 | 4/2003 |
| WO | WO 2007/090163 | 8/2007 |
| WO | WO 2011/060525 | 5/2011 |

OTHER PUBLICATIONS

C. Ware, "Information Visualization: Perception for Design", The Environment, Optics, Resolution, and the Display, Apr. 7, 2004, 2 pages.

Harrison, et al., "OmniTouch: Wearable Multitouch Interaction Everywhere", UIST '11, Oct. 16-19, 2011, 10 pages.

Holz, et al., "Implanted User Interfaces", CHI '12, May 5-10, 2012, 10 pages.

Kato, et al., "Maker Tracking and HMD Callibration for a Video-based Augmented Reality Conferencing System", Oct. 20, 1999, 10 pages.

Normand, et al., "A Typology of Augmented Reality Applications Based on Their Tracking Requirements", Mar. 8, 2012, 4 pages.

Sakata, et al., "Visual Assist with a Laser Pointer and Wearable Display for Remote Collaboration", 2006, 17 pages.

Piltz-Seymour, et al., "Visual Fields in Glaucoma", 2006, vol. 3, Chapter 49, 23 pages.

Cantor, et al., "Basic and Clinical Science Course—Glaucoma" 2002-2003 Edition, 306 pages.

Choplin et al., "Definition of the Visual Field", 1998, 3 pages.

\* cited by examiner

FIG. 12

US 9,091,849 B2

WEARABLE DISPLAY AND ADJUSTING METHOD THEREOF

This application claims the benefits of U.S. provisional application Ser. No. 61/695,390, field Aug. 31, 2012 and Taiwan application Serial No. 101150615, filed Dec. 27, 2012, the subject matters of which are incorporated herein by reference.

TECHNICAL FIELD

The disclosure relates in general to a display and an adjusting method thereof, and more particularly to a wearable display and an adjusting method thereof.

BACKGROUND

Recently, more and more friendly user interfaces and products using the same are invented. For example, augmented reality (AR) or mixed reality (MR) is integrated into a wearable display, such that the interaction between the user and the machine can be friendlier and the user experiment is enhanced.

Vision calibration is required for the wearable display to solve the matching conflict of an eye perception and a displaying content. Particularly, a wearable display or a head mounted display integrated with a depth sensor to sense the location or the movement of hands or fingers. If the vision perception and the display content cannot be matched up, the display content is not easy to use. Eye location and seeing angle to the wearable display or the head mounted display are always predefined. If the eye location is shifted then the display cannot detect this situation and cannot take any action immediately.

SUMMARY

The disclosure is directed to a wearable display and an adjusting method thereof.

According to a first aspect of the present disclosure, an adjusting method of a wearable display is provided. The adjusting method is for adjusting an orientation of the wearable display. The adjusting method comprises the following steps. A background image is provided. A central mark is displayed. The central mark is overlapped with the background image. A first sight line passes through the central mark. A blind spot mark is displayed. The blind spot mark is overlapped with the background image. A second sight line passes through the blind spot mark. An included angle between the first sight line and the second sight line is substantially 14 to 16 degrees.

According to a second aspect of the present disclosure, a wearable display is provided. The wearable display comprises a display unit and a processing unit. The processing unit is used for controlling the displaying unit to show a central mark and a blind spot mark overlapped with a background. A first sight line passes through the central mark. A second sight line passes through the blind spot mark. An included angle between the first sight line and the second sight line is substantially 14 to 16 degrees.

According to a third aspect of the present disclosure, an adjusting method of a wearable display is provided. The adjusting method is for adjusting an orientation of the wearable display. The adjusting method comprises the following steps. A background image is provided. A central mark which is overlapped with the background image is displayed. A blind spot mark which is overlapped with the background image is displayed. A distance between the central mark and the blind spot mark is 3 to 5 centimeters.

According to a fourth aspect of the present disclosure, a wearable display is provided. The wearable display comprises a displaying unit and a processing unit. The processing unit is used for controlling the display unit to show a central mark and a blind spot mark overlapped with a background image. A distance between the central mark and the blind spot mark is 3 to 5 centimeters.

The above and other aspects of the disclosure will become better understood with regard to the following detailed description of the non-limiting embodiment(s). The following description is made with reference to the accompanying drawings.

DETAILED DESCRIPTION

Figure 1:
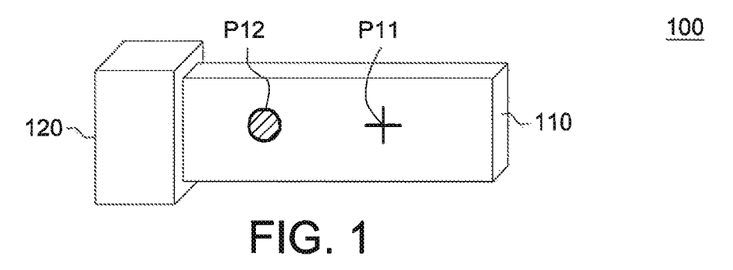
FIG. 1 is a drawing of a wearable display according to an embodiment of the present disclosure.

Please referring to FIG. 1, FIG. 1 is a drawing of a wearable display 100 according to an embodiment of the present disclosure. The wearable display 100 can be worn in front of the user's eyes to display an image.

For example, the wearable display 100 can be a kit. When the user is going to use the wearable display 100, the wearable display 100 can be assembled on a pair of glasses, a cap or an earphone. The assembled wearable display 100 can be located in front of the user's eyes for watching the image.

Or, the wearable display 100 can be a complete set. The wearable display 100 can be designed as a pair of glasses which can be worn for watching the image in front of the eyes. Or, the wearable display 100 can be designed as a cap which can be worn for watching the image in front of the eyes.

The wearable display 100 comprises a display unit 110 and a processing unit 120. The display unit 110 is used for displaying varied images. The display unit 110 can be a transparent display film or a transparent display panel. When the user watches an image shown on the display unit 110, a background image P10 (shown in FIG. 6) can be watched also. The background image P10 can be a real scene or a projection image provided from a projector. The image shown on the display unit 110 can be overlapped with the background image P10.

The processing unit 120 is used for performing varied calculation process and varied image processing process. For example, the processing unit 120 can be a circuit board, a processing chip or a storage device storing a plurality of program codes.

When the wearable display 100 is worn on the user, the user can adjust the angle and the height of the wearable display 100, for matching up the vision perception and the display content. The wearable display 100 and the adjusting method thereof according to the present embodiment can help the user to perform an accurately adjustment. A flow chart is provided for illustrating the operation of the wearable display 100.

Figure 2:
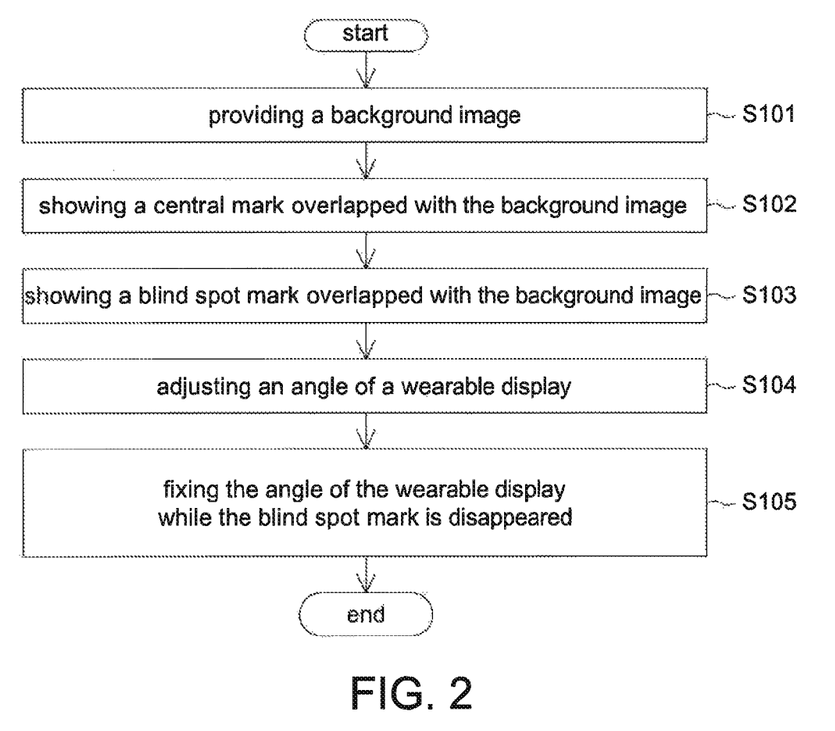
FIG. 2 is a drawing of a flowchart of an adjusting method of a wearable display according to an embodiment of the present disclosure.

Please referring to FIG. 2, FIG. 2 is a drawing of the flowchart of the adjusting method of the wearable display 100. The orientation of the wearable display 100 can be adjusted accurately through the adjusting method, such that a vision perception and a display content can be matched up. In step S101, the background image P10 (shown in FIG. 6) is provided.

In step S102, the processing unit 120 controls the display unit 110 to show a central mark P11 overlapped with the background image P10.

In step S103, the processing unit 120 controls the display unit 110 to show a blind spot mark P12 overlapped with the background image P10.

Figure 3:
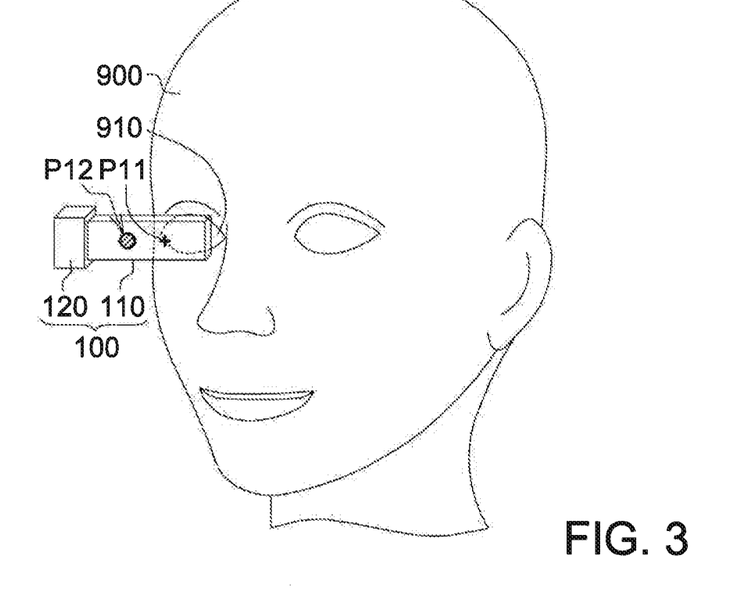
FIG. 3 is a drawing of a relationship between a wearable display and a user according to an embodiment of the present disclosure.

Please referring to FIG. 3, FIG. 3 is a drawing of a relationship between the wearable display 100 and the user 900 according to an embodiment of the present disclosure. The wearable display 100 is displayed in front of a single eye 910 of the user 900. That is to say, the user 900 can see the central mark P11 and the blind spot mark P12 via the same eye 910.

Figure 4:
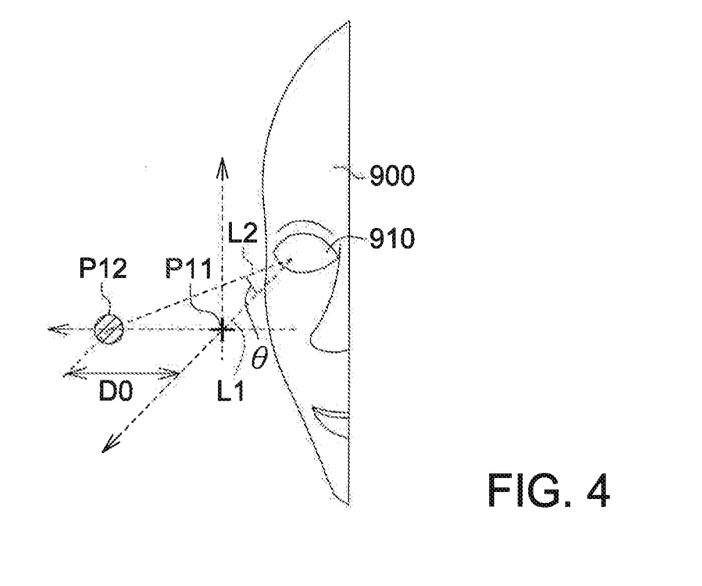
FIG. 4 is a drawing of a relationship between a central mark, a blind spot mark and eyes according to an embodiment of the present disclosure.

Please further referring to FIG. 4, FIG. 4 is a drawing of a relationship between the central mark, the blind spot mark and the eyes according to an embodiment of the present disclosure. A first sight line L1 passes through the central mark P11, a second sight line L2 passes through the blind spot mark P12. An included angle θ of the first sight line L1 and the second sight line L2 is substantially 14 to 16 degrees. In the present embodiment, the included angle θ is substantially 15 degrees.

Or, if a distance D0 between the central mark P11 and the blind spot mark P12 is 3 to 5 centimeters, the included angle θ between the first sight line L1 and the second sight line L2 will be 14 to 16 degrees. For example, the distance D0 between the central mark P11 and the blind spot mark P12 can be 4 centimeters.

Figure 5:
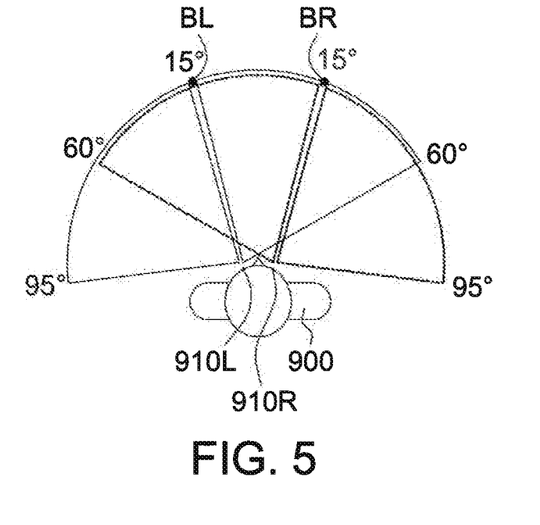
FIG. 5 is a drawing of blind spot areas according to an embodiment of the present disclosure.

Please referring to FIG. 5, FIG. 5 is a drawing of the blind spot areas BL, BR according to an embodiment of the present disclosure. Generally speaking, the visual range of a left eye 910L of the user 900 is approximately between clockwise 60 degrees and anti-clockwise 95 degrees. Due to the distribution of the retinal nerve, there is a blind spot area BL located in anti-clockwise 14 to 16 degrees. Similarly, the visual range of a right eye 910R of the user 900 is approximately between anti-clockwise 60 degrees and clockwise 95 degrees. Due to the distribution of the retinal nerve, there is a blind spot area BR located in clockwise 14 to 16 degrees. The user cannot see the image in the blind spot areas BR, BL. That is to say, if a pattern is shifted to the blind spot areas BR, BL form other areas, then the user 900 will feel that the pattern is disappeared in front of the eyes.

In step S104, the user 900 can adjust the angle of the wearable display 100. During the adjustment, the user 900 can aim the central mark P11 at the center of the sight line, and rotates the wearable display 100 by taking the central mark P11 as an axis, such that the blind spot mark P12 can be rotated around the central mark P11.

Figure 6:
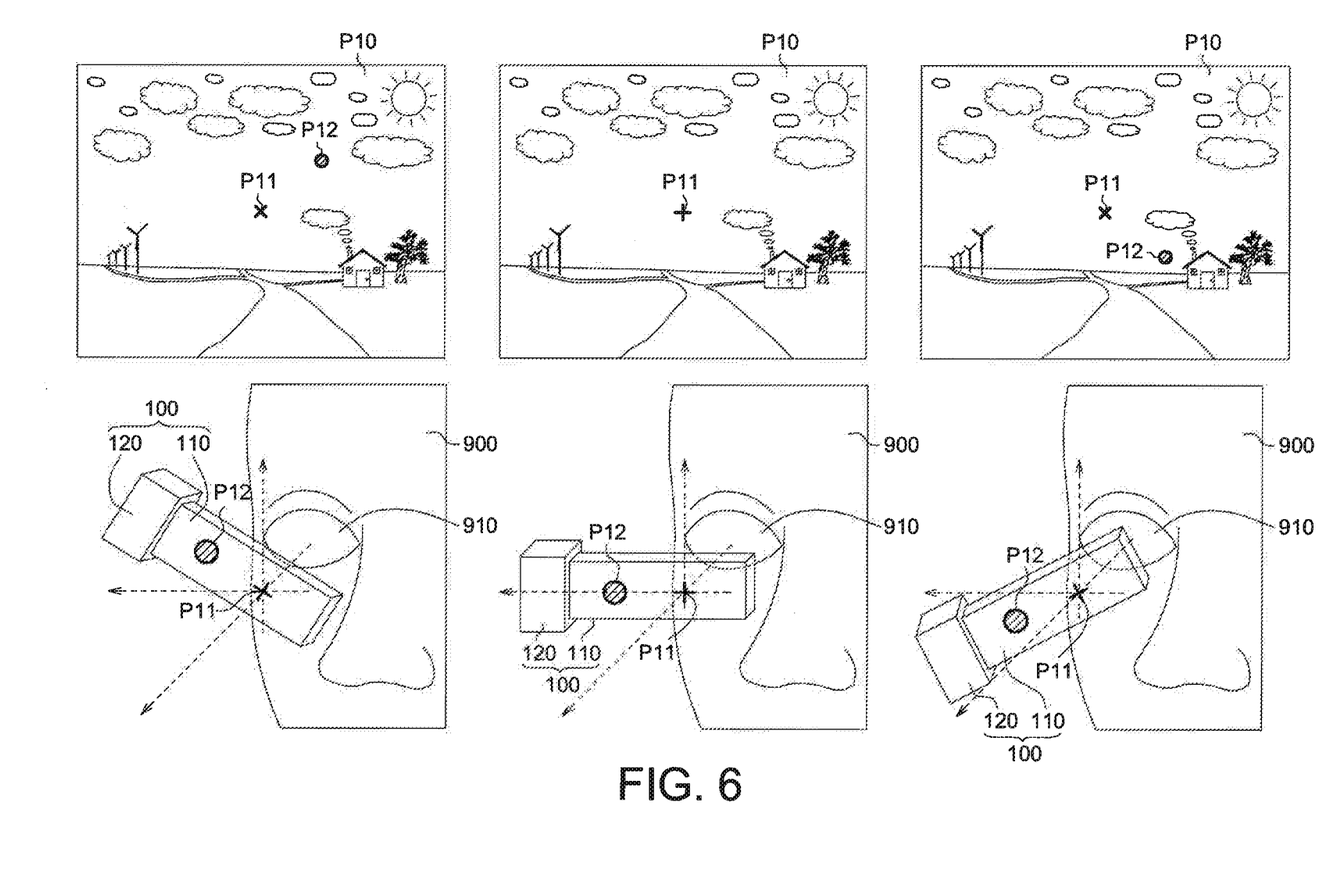
FIG. 6 is a drawing of a relationship with a central mark, a blind spot mark and a background image while a wearable display is adjusting according an embodiment of the present disclosure.

Please referring to FIG. 6, FIG. 6 is a drawing of a relationship with the central mark P11, the blind spot mark P12 and the background image P10 while the wearable display 100 is adjusting according an embodiment of the present disclosure. As shown in the left portion of FIG. 6, when the blind spot mark P12 slightly shifts upward, the blind spot mark P12 is not located in the blind spot area BR of FIG. 5, therefore the blind mark P12 can be seen on the background image P10. As shown in the right portion of FIG. 6, when the blind spot mark P12 slightly shifts downward, the blind spot mark P12 is not located in the blind spot area BR of FIG. 5, therefore the blind mark P12 can be seen on the background image P10. As shown in the middle portion of FIG. 6, when the blind spot mark P12 is located at a horizontal position, the blind spot mark P12 is located in the blind spot area BR of FIG. 5, therefore the blind mark P12 will be disappeared.

In step S105, while the blind spot mark P12 is disappeared, the angle of the wearable display 100 is fixed. The fixed angle is a predetermined correct angle. If the angle of the wearable display 100 is fixed at this predetermined correct angle, then the vision perception and the display content can be ensured to be matched up.

In the embodiment of FIG. 1, the central mark P11 is cross shaped, the blind spot mark P12 is circular shaped. The cross shaped central mark P11 is convenient for the user 900 to aim the central mark P11 at the center of the sight line. The circular shaped blind spot mark P12 is convenient for the user 900 to determine whether the blind spot mark P12 is disappeared or not.

Figure 7:
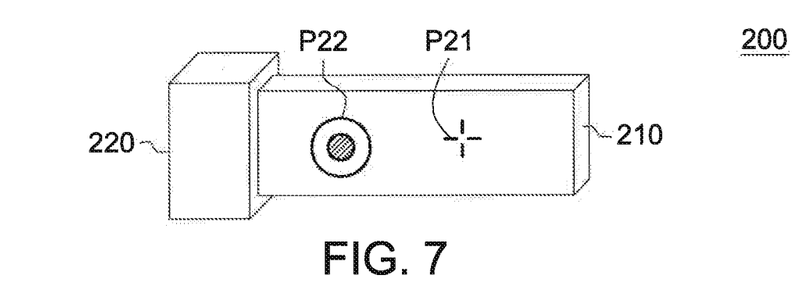
FIG. 7 is a drawing of a wearable display according to an embodiment of the present disclosure.

Please referring to FIG. 7, FIG. 7 is a drawing of a wearable display 200 according to an embodiment of the present disclosure. In one embodiment, a central mark P21 can be composed of a plurality of patterns, a blind spot mark P22 can be composed of a plurality of patterns. The central mark P21 composed of the plurality of patterns can be took as an integral element. The center point of the integral central mark P21 is used for being the target to be aimed. The blind spot mark P22 composed of the plurality of patterns can be took as an integral element, the user 900 determines whether all of the patterns of the blind spot mark P22 are disappeared or not.

Figure 8:
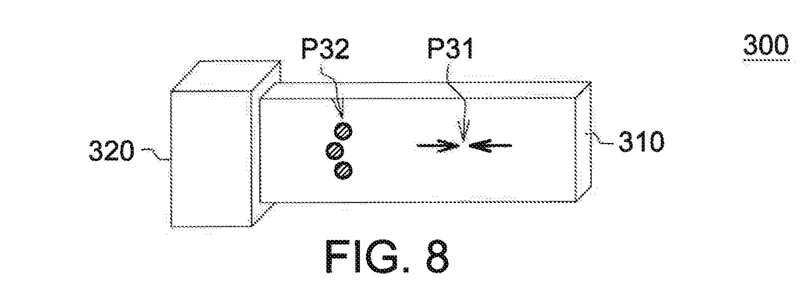
FIG. 8 is a drawing of a wearable display according to an embodiment of the present disclosure.

Please referring to FIG. 8, FIG. 8 is a drawing of a wearable display 300 according to an embodiment of the present disclosure. In one embodiment, a central mark P31 can be composed of a plurality of patterns, a blind spot mark P32 can be composed of a plurality of patterns. The central mark P31 composed of the plurality of patterns can be took as an integral element. The center point of the integral central mark P31 is used for being the target to be aimed. The blind spot mark P32 composed of the plurality of patterns is took as several individual elements. The user 900 determines whether the middle pattern of the blind spot mark P32 is disappeared or not.

Figure 9:
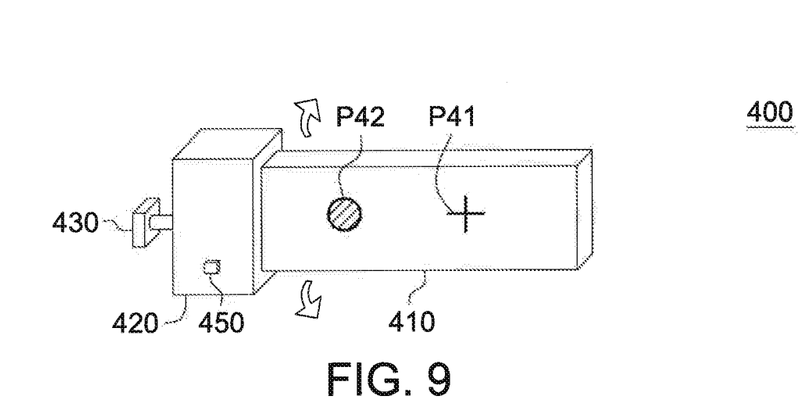
FIG. 9 is a drawing of a wearable display according to an embodiment of the present disclosure.

Please referring to FIG. 9, FIG. 9 is a drawing of a wearable display 400 according to an embodiment of the present disclosure. In one embodiment, the wearable display 400 can be automatically rotated by the rotating unit 430. The user 900 only needs to push a stop button 450, the rotation of the wearable display 400 can be stopped. The rotating unit 430 can be a gear wheel module or a swinging bar.

Figure 10:
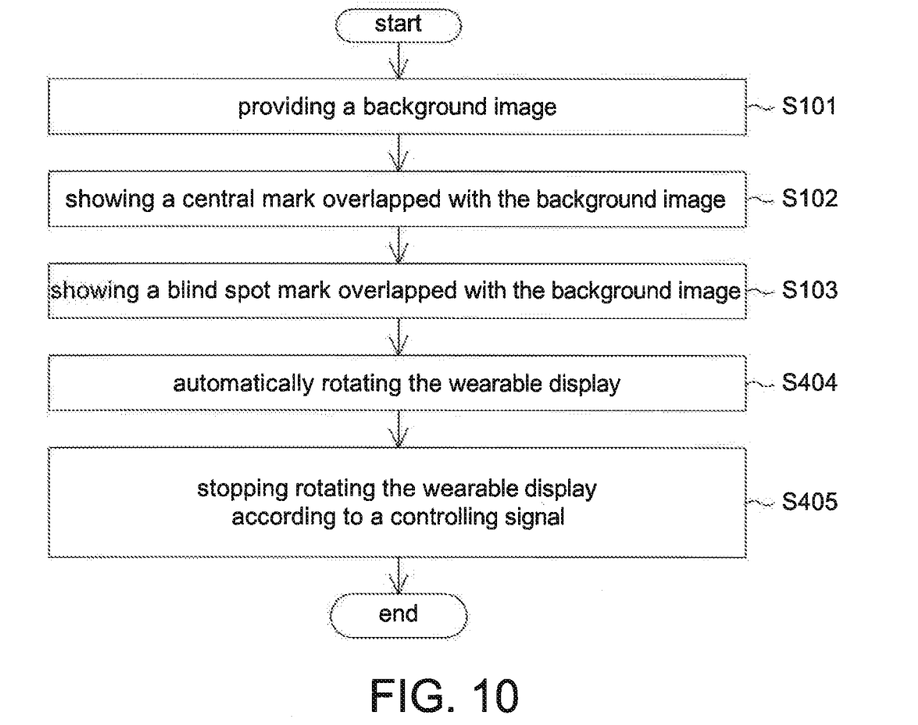
FIG. 10 is a drawing of a flowchart of an adjusting method of a wearable display according to an embodiment of the present disclosure.

Please referring to FIGS. 9 and 10, FIG. 10 is a drawing of a flowchart of an adjusting method of the wearable display 400 according to an embodiment of the present disclosure. In step S101, the background image P10 (shown in FIG. 6) is provided.

In step S102, a processing unit 420 controls a display unit 410 to show a central mark P41 overlapped with the background image P10.

In step S103, the processing unit 420 controls the display unit 410 to show a blind spot mark P42 overlapped with the background image P10.

In step S404, the rotating unit 430 automatically rotates the wearable display 400. For example, the rotating unit 430 can rotate the wearable display 400 clockwise and anti-clockwise in a uniform speed by taking the central mark P41 as an axis. When the wearable display 400 is automatically rotating, the user 900 can observe a location of the wearable display 400 where the blind spot mark P42 is disappeared.

In step S405, the wearable display 400 is stopped rotating according to a controlling signal generated from pushing the stop button 450 by the user 900. Meanwhile, the wearable display 400 is fixed at a correct angle. Because the wearable display 400 is fixed at the correct angle, the vision perception and the display content can be ensured to be matched up.

Figure 11:
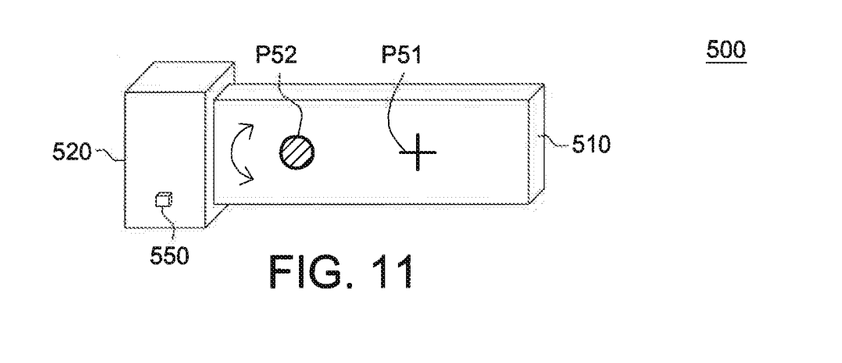
FIG. 11 is a drawing of a wearable display according to an embodiment of the present disclosure.

Please referring to FIG. 11, FIG. 11 is a drawing of a wearable display 500 according to an embodiment of the present disclosure. In one embodiment, the wearable display 500 can automatically rotate a blind spot mark P52 by the processing unit 520. The user 900 only needs to push a stop button 550, the rotation of the wearable display 500 can be stopped.

Figure 12:
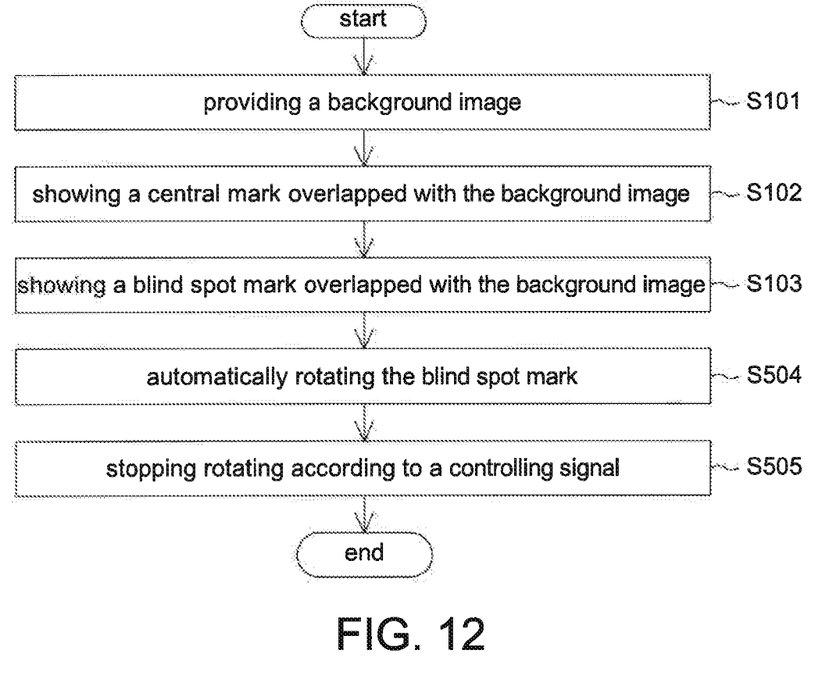
FIG. 12 is a drawing of a flowchart of an adjusting method of a wearable display according to an embodiment of the present disclosure.

Please referring to FIGS. 11 and 12, FIG. 12 is a drawing of a flowchart of an adjusting method of the wearable display 500 according to an embodiment of the present disclosure. In step S101, the background image P10 (shown in FIG. 6) is provided.

In step S102, a processing unit 520 controls a display unit 510 to show a central mark P51 overlapped with the background image P10.

In step S103, the processing unit 520 controls the display unit 510 to show the blind spot mark P52 overlapped with the background image P10.

In step S504, the processing unit 520 automatically rotates the blind spot mark P52, and keeps the wearable display 500 fixing. For example, the processing unit 520 can rotate the blind spot mark P52 clockwise and anti-clockwise in a uniform speed by taking the central mark P51 as an axis central mark P51. When the blind spot mark P52 is automatically rotating, the user 900 can observe a position of the blind spot mark P52 where the blind spot mark P52 is disappeared.

In step S505, the blind spot mark P52 is stopped rotating according to a controlling signal generated from pushing the stop button 550 by the user 900. Meanwhile, the image shown on the display unit 510 is fixed at a correct angle. Because the image shown on the display unit 510 is fixed the correct angle, the vision perception and the display content can be ensured to be matched up.

While the disclosure has been described by way of example and in terms of the exemplary embodiment(s), it is to be understood that the disclosure is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. An adjusting method of a wearable display, for adjusting an orientation of the wearable display, the adjusting method comprising:
   providing a background image,
   displaying a central mark on a display unit of the wearable display, wherein the central mark is overlapped with the background image, and a first sight line passes through the central mark; and
   displaying a blind spot mark on the display unit, wherein the blind spot mark is overlapped with the background image, a second sight line passed through the blind spot mark, and an included angle between the first sight line and the second sight line is 14 to 16 degrees.

2. The adjusting method of the wearable display according to claim 1, wherein the included angle is 15 degrees.

3. The adjusting method of the wearable display according to claim 1, wherein the central mark and the blind spot mark are displayed in front of the same eye.

4. The adjusting method of the wearable display according to claim 1, further comprising:
   automatically rotating the wearable display.

5. The adjusting method of the wearable display according to claim 4, further comprising:
   stopping the rotation of the wearable display according to a controlling signal.

6. The adjusting method of the wearable display according to claim 1, further comprising:
   automatically rotating the blind spot mark.

7. The adjusting method of the wearable display according to claim 6, further comprising:
   stopping the rotation of the blind spot mark according to a controlling signal.

8. The adjusting method of the wearable display according to claim 6, wherein the central mark is cross shaped and the blind spot mark is circular shaped.

9. The adjusting method of the wearable display according to claim 1, wherein the blind spot mark is composed of a plurality of patterns.

10. The adjusting method of the wearable display according to claim 1, wherein the central mark is composed of a plurality of patterns.

11. A wearable display, comprising:
   a display unit; and
   a processing unit, used for controlling the display unit to show a central mark and a blind spot mark overlapped with a background, wherein a first sight line passes through the central mark, a second sight line passes through the blind spot mark, and an included angle between the first sight line and the second sight line is 14 to 16 degrees.

12. The wearable display according to claim 11, wherein the included angle is 15 degrees.

13. The wearable display according to claim 11, wherein the central mark and the blind spot mark are displayed in front of the same eye.

14. The wearable display according to claim 11, further comprising:
   a rotating unit, used for automatically rotating the wearable display.

15. The wearable display according to claim 14, wherein the rotating unit stops the rotation of the wearable display according to a controlling signal.

16. The wearable display according to claim 11, wherein the processing unit further automatically rotates the blind spot mark.

17. The wearable display according to claim 16, wherein the processing unit further stops the rotation of the blind spot mark according a controlling signal.

18. The wearable display according to claim 11, wherein the central mark is cross shaped and the blind spot mark is circular shaped.

19. The wearable display according to claim 11, wherein the blind spot mark is composed of a plurality of patterns.

20. The wearable display according to claim 11, wherein the central mark is composed of a plurality of patterns.

21. An adjusting method of a wearable display, for adjusting an orientation of the wearable display, the adjusting method comprising:
   providing a background image;
   displaying a central mark on a display unit of the wearable display, wherein the central mark is overlapped with the background image: and
   displaying a blind spot mark on the display unit, wherein the blind spot mark is overlapped with the background image, a distance between the central mark and the blind spot mark measured on the display unit is 3 to 5 centimeters.

22. The adjusting method of the wearable display according to claim 21, wherein the distance between the central mark and the blind spot mark measured on the display unit is 4 centimeters.

23. A wearable display, comprising:
   a display unit; and
   a processing unit, used for controlling the display unit to show a central mark and a blind spot mark overlapped with a background image, wherein a distance between the central mark and the blind spot mark measured on the display unit is 3 to 5 centimeters.

24. The wearable display according to claim 23, wherein the distance between the central mark and the blind spot mark measured on the display unit is 4 centimeters.

* * * * *